United States Patent [19]
Erlichman

[11] Patent Number: 4,630,069
[45] Date of Patent: Dec. 16, 1986

[54] COLOR THERMAL TRANSFER RECORDING SYSTEM AND RIBBON

[75] Inventor: Irving Erlichman, Wayland, Mass.

[73] Assignee: Polaroid Corporation, Cambridge, Mass.

[21] Appl. No.: 737,507

[22] Filed: May 24, 1985

[51] Int. Cl.⁴ ............................................. G01D 15/10
[52] U.S. Cl. .............................. 346/76 PH; 346/105; 400/120
[58] Field of Search ................. 346/76 PH, 153, 162, 346/105, 106; 400/120; 219/216 PH

[56] References Cited

U.S. PATENT DOCUMENTS

| | | | |
|---|---|---|---|
| 3,726,212 | 4/1973 | Combs | 101/21 |
| 4,195,937 | 4/1980 | Baran | 346/76 PH |
| 4,250,511 | 2/1981 | Stein et al. | 346/76 |
| 4,458,253 | 7/1984 | Goff, Jr. et al. | 346/76 |

FOREIGN PATENT DOCUMENTS

| | | | |
|---|---|---|---|
| 0082284 | 7/1981 | Japan | 346/76 PH |
| 0129216 | 8/1983 | Japan | 346/76 PH |

Primary Examiner—Arthur G. Evans
Attorney, Agent, or Firm—John S. Vale

[57] ABSTRACT

A closed loop thermal transfer recording system and color transfer ribbon having a plurality of different color ink stripes thereon are provided for recording a color tonal image on a recording sheet. Precise control over the size of dots formed by ink transfer is achieved by monitoring the density of a thermally sensitive indicator layer on the back side of the ribbon which provides, for each different ink color, indicator marks that are proportional to recorded pixel density, and feeding this information back to a control system which compares monitored density with desired density and regulates heat input to the ribbon accordingly.

23 Claims, 8 Drawing Figures

COLOR THERMAL TRANSFER RECORDING SYSTEM AND RIBBON

BACKGROUND OF THE INVENTION

The present invention relates to the field of thermal transfer recording and, more particularly, to a thermal transfer recording system and a specially configured multi-stripe color transfer ribbon for recording a tonal or grey scale color image on a recording sheet.

The concept of using a thermal transfer ribbon carrying sequential stripes of three or more different color thermally transferable inks thereon for recording a color image on a recording sheet, e.g. plain paper, is well known in the art.

Typically, the ribbon comprises a web having parallel stripes of different color ink on one surface. The stripes, generally extending perpendicular to the web's direction of travel, are disposed in a repeating series or set of four different colors—e.g. yellow, magenta, cyan and black.

The ribbon is adapted to be located between the recording sheet and an oppositely disposed print head of the line printing type comprising a linear array of individually addressable heating elements. With the first ink stripe of a set registered or overlying the print head, selected heating elements are energized causing ink transfer to the recording sheet. The transfered ink forms dots of a first color on the first line of the recording sheet. The size of each dot generally is proportional to the amount of heat applied, i.e., dot size progressively increases with increased amounts of heat applied to form a dot. Next, the ribbon is advanced relative to the print head to register the next color stripe. The recording sheet is held in place so that dots of the second color are recorded over the first set of dots on the same line. The sequence is repeated to overprint the third and fourth ink colors, thus providing a line of pixel defining resultant dots of desired colors in a manner analogous to four-color lithograph printing. Then, the recording sheet is advanced one line position relative to the print head and the four step process of sequential overprinting with each ink color in the set is repeated to record the next line, etc.

For representative examples of thermal color recording systems employing this technique see U.S. Pat. Nos. 4,250,511 and 4,458,253. Also see U.S. Pat. No. 3,726,212 wherein separate different color transfer ribbons are mounted in side by side relation on a linear translatable carriage for sequential presentation at a registered position overlying the print head.

The color image to be recorded is defined by a matrix array of minute pixel areas each of which has a desired color and density or tone generally specified by electronic image signals provided from a computer or video source. The desired color is produced by specifying which of the different ink colors are to be combined by overprinting to produce a resultant dot of a desired color in a given pixel area. The overall tone or density of a given pixel area, on the other hand, is defined by the size of the resultant dot recorded in relation to the overall size of the pixel area. If the resultant dot is printed on white paper and is small compared to the area of the pixel area, the eye will perceive it as being of very light tone. If the resultant dot is larger, e.g., half the size of the pixel area, the eye perceives this to be a pixel area of medium tone or density. To produce the darkest tone or density, the resultant dot is made large enough to substantially fill the pixel area. Thus, perceived tone is adjusted by varying dot size in a manner analogous to half-tone color lithographic printing.

The quality of the recorded image therefore is heavily dependent on how precisely the thermal transfer recording system can control dot size. For color recording, the dot size control problem is especially difficult because to form a resultant dot of a given color it may have to be over printed with up to three different ink colors each of which may have a slightly different size to achieve correct color balance.

The prior art recording systems noted above do not address the issue of varying dot size in a precise manner. As noted earlier, the size of a thermally transfered dot generally will be proportional to the amount of heat applied to an ink stripe to effect ink transfer. If there are variations in the resistivity of the individual print head elements or variations in the heating voltage applied to these elements, the amount of heat generated will vary from element to element and control over dot size is impaired. In addition, there may be variations in the thermal response of different parts of the ribbon which also diminish ability to precisely control dot size.

In my earlier filed, commonly assigned, copending applications U.S. Ser. Nos. (Polaroid cases 7075 and 7076) are disclosed and claimed a closed loop thermal transfer recording system and specially configured thermal transfer ribbon for recording a monochrome tonal or grey scale image on a recording sheet.

The ribbon has a thermally transferable ink layer on the front side which contacts the recording sheet and a thermally sensitive indicator layer on the back side. When heat is applied to the ribbon, an indicator mark is formed on the back side which is proportional to the size of the recorded ink dot. Thus, the density of the ribbon area where the corresponding mark is formed is indicative of the density of the pixel area in which the ink dot is formed. Control over the application of heat is achieved by feedback. The corresponding mark is optically monitored with a photodetector to provide a monitored density signal. This indication of actual density is compared to the electronic image signals specifying desired density. Based on this comparison, the application of heat is regulated to progressively increase dot size until a predetermined comparison value is achieved, whereupon application of heat is terminated.

In the interest of improving the quality of color images produced by thermal transfer recording, there is the need for a thermal transfer recording system and color ribbon which is configured to operate in a closed loop mode for more precisely controlling recorded dot size.

Therefore, it is an object of the present invention to provide a thermal transfer recording system and color thermal transfer ribbon capable of recording high quality color tonal images by providing the ability to more precisely control the size of recorded dots.

It is another object of the invention to provide such a thermal transfer recording system and ribbon for recording a tonal or grey scale color image by printing ink dots of varying color and size on a recording sheet.

Yet another object is to provide such a thermal transfer recording system which operates in closed loop mode and is configured to optically monitor indicator marks on the back side of the ribbon for controlling the size of dots formed from each of a plurality of different color inks disposed in sequential stripes on the front side of the ribbon.

Still another object is to provide such a recording systems including means for efficiently advancing the ribbon with respect to the print head to sequentially present each of the ink stripes in a set at a registered position with respect to the print head.

Other objects of the invention will, in part, be obvious and will, in part, appear hereinafter.

SUMMARY OF THE INVENTION

The present invention provides a thermal transfer recording system for recording a tonal color image, represented by pixel areas of varied color and density on a recording sheet, and a color thermal transfer ribbon which is specially configured for use with the recording system.

The ribbon is of the multi-stripe type having on one side thereof a set of different color thermally transferable ink stripes from which ink may be transferred in sequence to the recording sheet, when heat is applied to the ribbon, to record dots defining a desired pixel area color and density. On the opposite side of the ribbon is a thermally sensitive indicator layer which is responsive to the heat applied to effect ink transfer for providing optically detectable marks that correspond and are proportional to dots recorded by ink transfer from each of the ink stripes in the set. The ribbon is configured such that dot and mark size increases with increased amounts of heat applied to the ribbon to form a dot and corresponding mark.

The image to be recorded is defined by electronic image signals provided from a computer or video source and, therefore, the system includes means for receiving image signals for each of the different ink colors indicative of a desired color and density for each pixel area of the desired image.

Other elements of the system include means for supporting a recording sheet; a print head; a ribbon support mounting the ribbon for movement relative to the print head; means for optically monitoring the corresponding indicator marks; means for comparing monitored density with desired density; means for operating the ribbon support; and means for operating the print head.

The print head is locatable at a printing position with respect to the recording sheet and is operable for applying heat to selected pixel area sections of a single ink stripe segment positioned in registration with the print head. The print head is configured so as to provide access to the registered segment of the indicator layer corresponding to the registered ink stripe segment for optical monitoring purposes.

The ribbon support mounts the ribbon for movement between the print head and recording sheet and is operable to sequentially present each ink stripe segment in the set at the registered position. The optical monitoring means, for example a photodetector, reads the density of the pixel area sections of the registered indicator segment and provides density signals indicative of the density of each selected pixel area. The density signals are compared with the image signals and the comparing means provides density comparison value signals for each selected pixel area.

The ribbon support operating means moves the ribbon relative to the print head for sequentially presenting each of the ink stripe segments in the set at the registered position during the course of a recording cycle. During this recording cycle, the print head is operated to effect ink transfer from each of the ink stripe segments sequentially presented at the registered position.

The print head operating means initially is responsive to the electronic image signals for regulating an initial application of heat to selected pixel area sections of the registered segment of the ribbon to form for each selected pixel area a dot and corresponding mark having an initial size smaller than necessary to achieve its desired density. Thereafter, the print head operating means is responsive to the density comparison value signals for regulating further application of heat to progressively increase dot and corresponding mark size until a predetermined value of density comparison is achieved for each selected pixel area.

Preferably, the print head and ribbon support means are coupled together for movement between extended and retracted positions. In the extended position the print head is located at its printing position and the registered ink stripe segment is in contact with the recording sheet in preparation for ink transfer. In the retracted position, the print head and ribbon support are backed away from the recording sheet so that the registered ink stripe segment is disengaged therefrom to facilitate movement of the ribbon relative to the print head to present the next ink stripe segment in the set at the registered position.

BRIEF DESCRIPTION OF THE DRAWINGS

For a fuller understanding of the nature and objects of the present invention, reference may be had to the following detailed description taken in connection with the accompanying drawings wherein.

DESCRIPTION OF THE PREFERRED EMBODIMENT

The present invention provides a later to be described thermal transfer recording system for recording a color tonal image on a recording sheet, and a specially configured color thermal transfer ribbon 10, adapted for use with the system, which will be described initially with reference to FIGS. 1, 2 and 3.

Ribbon 10 is a multi-layer structure or laminate comprising, in order, a multi-stripe thermally transferable ink layer 12, an electrically resistive heating element layer 14, and a thermally sensitive and electrically conductive indicator layer 16. For descriptive purposes only, in this specification ink layer 12 is designated as being on the front side of ribbon 10. Therefore, indicator layer 16 is on the back side with layer 14 in the middle portion of the ribbon between layers 12 and 16.

Ink layer 12 comprises a plurality of different color, thermally transferable, ink stripes 17 extending in side-by-side parallel relation along the length of ribbon 10 to form a sequential set or series of color ink stripes 17. In the illustrated embodiment, the set includes 4 color ink stripes 17—yellow, cyan, magenta and black—designated 17Y, 17C, 17M, and 17B, respectively. The ink preferably is of the transparent type allowing a desired color to be formed subtractably by overprinting selected ink colors.

Figure 1:
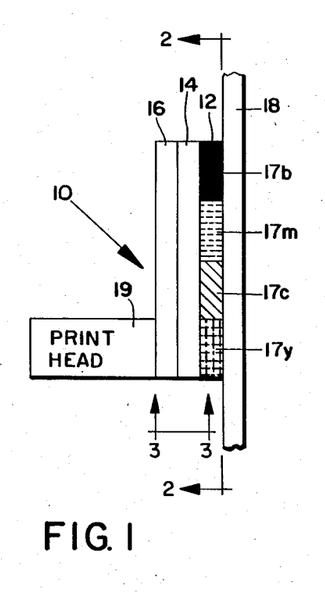
FIG. 1. is a side elevational view of the color thermal transfer ink ribbon shown in operative relation to a recording sheet and a diagrammatically illustrated print head.
Figure 2:
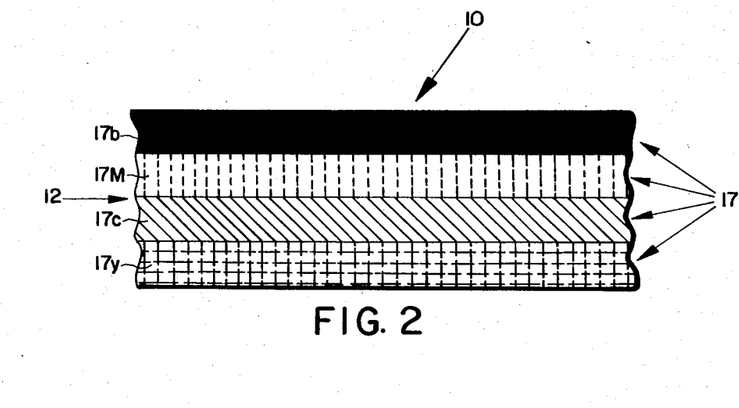
FIG. 2 is a front elevational view of the ribbon taken along line 2—2 of FIG. 1.

In use, as best shown on FIG. 1, ribbon 10 is adapted to be advanced in single stripe increments between an ink receiving recording sheet 18, e.g., plain paper, and an oppositely spaced heat generating print head 19 located at a printing or recording position with respect to sheet 18. The ink bearing front side of ribbon 10 faces sheet 18, and the indicator layer 16 on the back faces print head 19. Print head 19 is configured to engage and apply heat only to a single ink stripe portion 17 of ribbon 10 that is registered or aligned with it.

In FIG. 1, the first or lowermost yellow ink stripe 17Y is at the registered postion. Upon operation of head 19, ink is selectively transferred to sheet 18 from stripe 17Y to record yellow dots in selected pixel area sections along a first line on sheet 18. Next, with sheet 18 held in place, head 19 is retracted or moved away from sheet 18, and ribbon 10 is advanced or moved downwardly to register the next stripe 17C at the printing position. Head 19 is returned to its operative position and selectively generates heat in the second ink stripe segment 17C to overprint cyan dots along the first line. This process is repeated for the third and fourth stripes 17M and 17B. By selectively overprinting the different ink colors, resultant dots of desired colors are formed along the first line.

Then, head 19 is retracted and sheet 18 is advanced to the next line position. The ribbon 10 is longitudinally advanced to locate a fresh segment thereof infront of head 19, and the ribbon is moved upwardly to locate the first stripe 17Y at the registered position in preparation for recording dots of the four different ink colors on the next line.

Ribbon 10 preferably is configured for use with a later to be described type of print head 19 that includes a linear array of pairs of space electrodes which are adapted to engage the back side portion (indicator layer 16) of a single ink-stripe wide registered segment of ribbon 10. The electrodes are operative to apply recording signals to the registered segment for generating heat in selected pixel area sections thereof to effect ink transfer and formation of optically detectable corresponding indicator marks as will become apparent.

Figure 3:
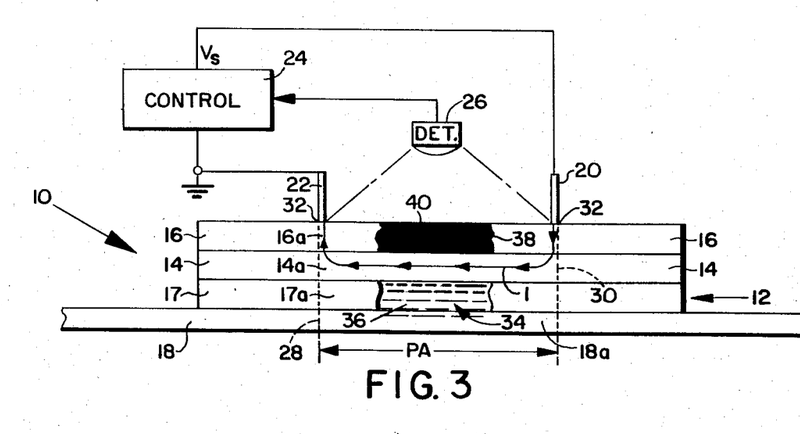
FIG. 3 shows that portion of the ribbon and recording sheet taken along lines 3—3 of FIG. 1 and also illustrates a pair of print head electrodes in engagement with the back side of the ribbon for forming a recorded ink dot and corresponding indicator mark.

With reference to FIG. 3, for visual clarity and to simplify the description of how ribbon 10 functions, only one pair of diagrammatically illustrated electrodes, individually designated 20 and 22, are shown engaging the indicator layer 16 on the back side of the registered ribbon segment 17 which is representative of any of the four different color ink stripes.

The first or signal applying electrode 20 is electrically connected to a recording signal output terminal of a diagrammatically illustrated control subsystem 24 of the recording system. The output terminal supplies recording signal output voltage designated $V_s$. The second or counter electrode 22 is connected to or set at a common ground potential with respect to a return path terminal of subsystem 24.

The spaced electrode structure leaves a pixel area section of layer 16 between the electrodes open, thereby providing access for optically monitoring the density of this pixel area section with means, such as a photodetector 26, which feeds back density signals to the control subsystem 24.

For purposes of illustration, in FIG. 3 a pixel area section PA of ribbon 10 between electrodes 20 and 22 is shown bounded by vertical dotted lines 28 and 30. The corresponding sections of the individual layers within section PA are designated 17A, 14A, and 16A. The corresponding pixel area section of sheet 18 in which a dot is to be formed by ink transfer from the registered ink stripe 17 is designated 18A.

In response to the application of recording signals $V_s$, a current flow path is established through the ribbon structure from the contacting end 32 of electrode 20 through the conductive indicator layer 16 to the underlying resistive layer 14; along layer section 14A toward counter electrode 22; and then through layer 16, once again to the contacting end 32 of counter electrode 22 as indicated by a current flow path indicating line I having current flow directional arrow heads therealong.

The ribbon 10 is designed so that the resisitve layer 14 is in thermally conductive relation to both the multi-stripe ink layer 12 and the indicator layer 16 on opposite sides thereof. The flow of current in resistive section 14A generates heat which is transmitted outwardly to both section 17A and 16A to cause thermally activated reactions therein.

In response to heat input from section 14A, a portion 34 of ink in section 17A fuses or changes from a solid to a liquid state which causes ink transfer to recording sheet section 18A thereby printing a dot 36 of the registered ink stripe color. Simultaneously, a portion of the generated heat is transmitted to an aligned portion 38 of indicator section 16A causing activation of thermally sensitive dyes incorporated in layer 16 which change color to form an optically detectable corresponding mark 40 which is proportional to the size of the recorded dot 36 in pixel area section 18A. The photodetector 26 measures the level of light reflected from indicator section 16A and provides a density reading which is proportional to the density of pixel area 18A. The density reading will vary in proportion to the size of the dark mark 40 which absorbs some of the light incident on section 16A.

In the illustrated three-layer ribbon 10, the resisitve layer 14 serves both as a flexible support for the outside layers 12 and 16 as well as a resistive heating element. Preferably, layer 14 is a polymer or resin film that is loaded with conductive carbon particles to reduce the inherent high resistivity of the film to a lower resistance value that permits sufficient current flow at reasonably low signal voltages to generate the amount of heat required for ink transfer and activation of the thermal dyes in indicator layer 16. Examples of resistive layer material suitable for use in ribbon 10 may be found in U.S. Pat. Nos. 4,477,198 and 4,470,714 along with various other patent and technical literature references cited therein.

The set of different color ink stripes 17Y, 17C, 17M and 17B coated on the front side of layer 14 are formed of appropriately colored thermal plastic or wax based ink or marking compositions that are known in the art. For representative examples of ink formulations that may be adapted for use in ribbon 10 reference may be had to U.S. Pat. Nos. 4,477,198 and 4,384,797 along with various patent and technical literature references cited therein.

The indicator layer 16 on the back side of ribbon 10 has two required characteristics. First, it must be sufficiently electrically conductive to provide adequate current flow through the thickness of the layer to establish the current flow path I. Also, the material composition must be thermally activatable to produce a visible or optically detectable mark on the back side of the ribbon in response to heat generated by the current flow in the resistive layer 14.

One type of material suitable for use in indicator layer 16 comprises a polymer binder having dispersed therein both thermally sensitive indicative components, to provide the indicator function and electro-conductive components for decreasing the resistivity of the layer to provide adequate current flow therethrough.

Typically, the thermally sensitive indicator components may take the form of leuco type dyes that are commonly used in thermally sensitive recording papers. The electro-conductive component may take the form of a metal iodide such as cuprous iodide or the like. For a more extensive description of various components that may be incorporated into indicator layer 16, reference may be had to U.S. Pat. Nos. 3,905,876; 3,951,757; and 4,133,933. Also, see a technical paper entitled "Electrothermal Sensitive Recording Sheets" by W. Shimotsuma et al, *Tappi*, October 1976, Volume 59 No. 10, pages 92 and 93.

It should be understood that the illustrated section PA in FIG. 3 is intended to be representative of a pixel area section of ribbon 10 which is effected when the current flow path I is established and that the actual size and shape of section PA will undoutedly vary slightly from the illustrated section bounded by lines 28 and 30.

A preferred method of utilizing ribbon 10 is to provide a pair of electrodes 20 and 22 which have substantially equal surface area ends 32 in contact with the outer surface of layer 16. This is done to induce substantially constant current density in section 14A so that heat is generated more or less uniformly across the width of section PA rather than being concentrated in the vicinity of one of the electrodes.

Before ink in a stripe 17 will fuse, it must be heated to a minimum activation temperature. Likewise, the dyes in indicator layer 16 will not change color or darken until a minimum activation temperature is achieved. Preferably, the compositions forming the ink stripes 17 and the indicator layer 16 are formulated such that the respective minimum activation temperatures coincide or are at least very close together.

Because the reactions in section 17A and 16A are triggered by a common heat source, the size of the indicator mark 40 is proportional to the size of the ink transfer dot 36. The proportionality or density ratio of the dot 36 and mark 40 may be determined by empirical testing to establish a calibration factor that is applied to the photodetector reading for calculating the actual size of dot 36 or the density of the pixel area section 18A in which dot 36 is formed.

The thermal response of the different color ink stripes 17 and indicator layer 16 is such that the size of a thermally transferred dot 36 and its corresponding indicator mark 40 is a function of the amount of heat applied to form such a dot and mark. That is, dot and mark size progressively increases with increased amounts of heat applied to form the dot and mark.

Upon initial fusion of ink in section 17A and the corresponding activation of thermal dyes in corresponding pixel area section 16A, and initial small dot 36 and corresponding mark 40 (compared to the area of section PA) are formed. In response to continued heat input, the dot 36 and mark 40 progressively increase in area or "grow". If the heat input is terminated, the dot 36 and mark 40 may grow a little larger due to residual heat in ribbon 10, but then growth will terminate when the temperature drops below the activation point. If heat input is resumed, upon exceeding the minimum activation temperature, dot and mark growth will resume. Growth continues until a full sized dot and mark which approximate the area of section PA are formed. Outside of the boundries of section PA, the temperature drops off to a point below the minimum activation temperature causing automatic inhibition of further dot and mark growth despite the fact that current still may be flowing in the current path I. Thus, the recorded dot 36 and its corresponding mark 40 start out small and progressively increase in size with increased amounts of heat applied to form them. The heat application may be continuous, in which case dot and mark size progressively increase without interruption until heat input is terminated, or the dot and mark reach full size; or dot and mark size may be progressively increased in steps by applying a succession of signal voltage pulses to produce corresponding heat imput pulses.

While the illustrated ribbon 10 has been described as having only three layers 12, 14 and 16, it should be understood that additional layers may be optionally included in the ribbon structure without departing from the spirit and scope of the invention involved herein. It is contemplated that such optional layers would be disposed between the resistive layer 14 and the multistripe ink layer 12 and/or between resistive layer 14 and the indicator layer 16. Functionally, such optional layers may serve to facilitate ink transfer (e.g. providing an ink release layer between layers 12 and 14) and/or enhance or better focus heat transfer from the resistive layer 14 to the outermost layers.

The ribbon 10 embodying the present invention has several advantages. It provides an indication of dot formation on the back side of the ribbon where the indication (mark 40) is accessible for monitoring. This is necessary because actual dot formation occurs at the ink layer/receiving sheet interface which is blocked from observation by the opaque nature of the receiving sheet 18 and the structure of the ribbon layers. Also, by incorporating an internal heating element layer 14 within the ribbon, heat may be generated employing spaced apart print head electrodes that provide access to the indicator marks for monitoring purposes unlike the case with a more conventional external heat generating print head which is configured to engage the back side of a thermal transfer ribbon in a manner that would cover the indicator mark forming area.

Perhaps, the most important advantage is that ribbon 10 provides the capability of separately monitoring the size of dots 36 formed from each of the four different ink colors which may be overprinted in sequence to form a resultant dot of a desired color. That is, corresponding marks 40 are formed for each of the four different ink stripes 17 sequentially registered with the print head 19.

The density of a pixel area 18A is determined by the size of the resultant dot recorded therein in relation to the size of the pixel area. Small resultant dots produce a light tone and larger dots produce darker tones.

The desired color of a resultant dot determines which of the different ink colors are to be overprinted or subtractively combined to produce the desired color. For a given desired color and density, the individual ink dots 36 that are overprinted may be of the same size or they may be varied in size for color correction purposes depending on the chromoticity characteristics of the four different inks in the set up stripes 17.

Color correction is achieved by printing less ink of certain colors in appropriate pixel areas in order to compensate for the color absorbing deficiencies of process (subtractive) inks. For example, since magenta ink acts as if it were contaminated with traces of yellow, less yellow should be used when this combination is to be overprinted. Similarly, both yellow and magenta should be reduced when used with cyan. Advantageously, the size of the individual different color ink dots may be varied, if necessary, in a controlled manner because ribbon 10 is configured to provide separate corresponding indicator marks 40 for each of the four different color ink stripes 17.

A thermal transfer recording system 42, embodying the present invention, which utilizes ribbon 10 for recording a color tonal image, defined by electronic image signals, on a recording sheet now will be described with reference to FIGS. 4–7, which show the general construction and components of system 42 and to FIG. 8 which shows the control system 24 in block diagram form.

Figure 4:
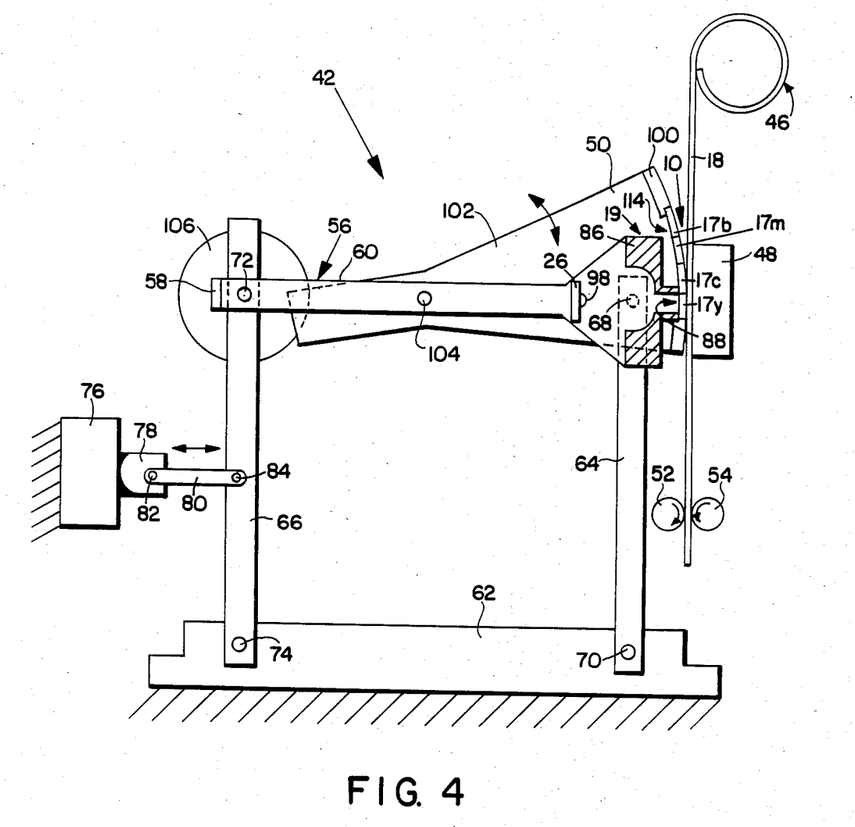
FIG. 4 is a side elevational view, partly in section, showing components of a thermal transfer recording system, embodying the present invention, in an operative extended printing position.

As best shown in FIG. 4, the recording sheet 18, in the form of any suitable ink receiving material, for example plain paper, extends downwardly from a supported supply roll 46 and passes between a fixed paper backing support or platen 48 and a pivotable ribbon support 50 carrying ribbon 10 and then down between a pair of stepper motor driven paper advancing or line indexing rollers 52 and 54. The supported roll 46, platen 48 and rollers 52 and 54 cooperate and function as means for supporting sheet 18 at an operative position for image recording.

Figure 6:
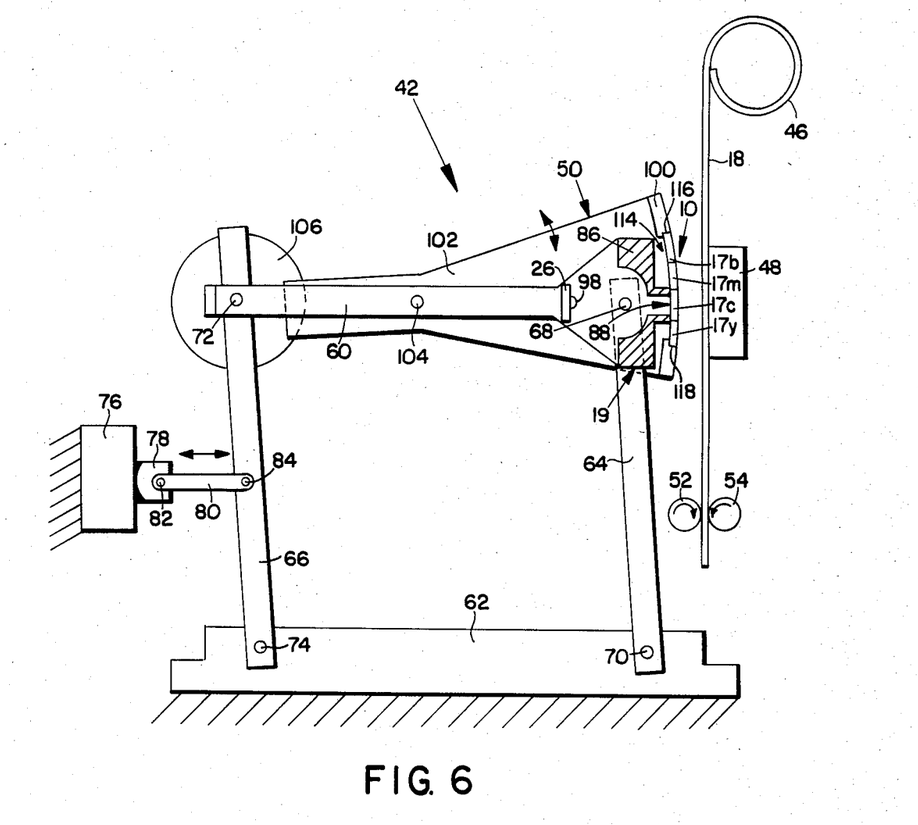
FIG. 6 is similar in some respects to FIG. 4 but shows the system components in an inoperative retracted position.

The ribbon support 50 is pivotably connected to and carried by a substantially linearly translatable print head carriage or frame 56 that forms part of a four-bar linkage for moving frame 56 toward and away from sheet 18 between an operative extended printing position of FIG. 4, wherein an ink stripe 17 (in this case stripe 17Y) registered with head 19 engages the facing surface of sheet 18 in preparation for selective ink transfer, and an inoperative retracted position of FIG. 6 wherein frame 56 has been moved back away from sheet 18 to disengage the ribbon in preparation for pivoting support 50 to locate another ink stripe 17 (the second stripe 17C) at the registered position.

Figure 5:
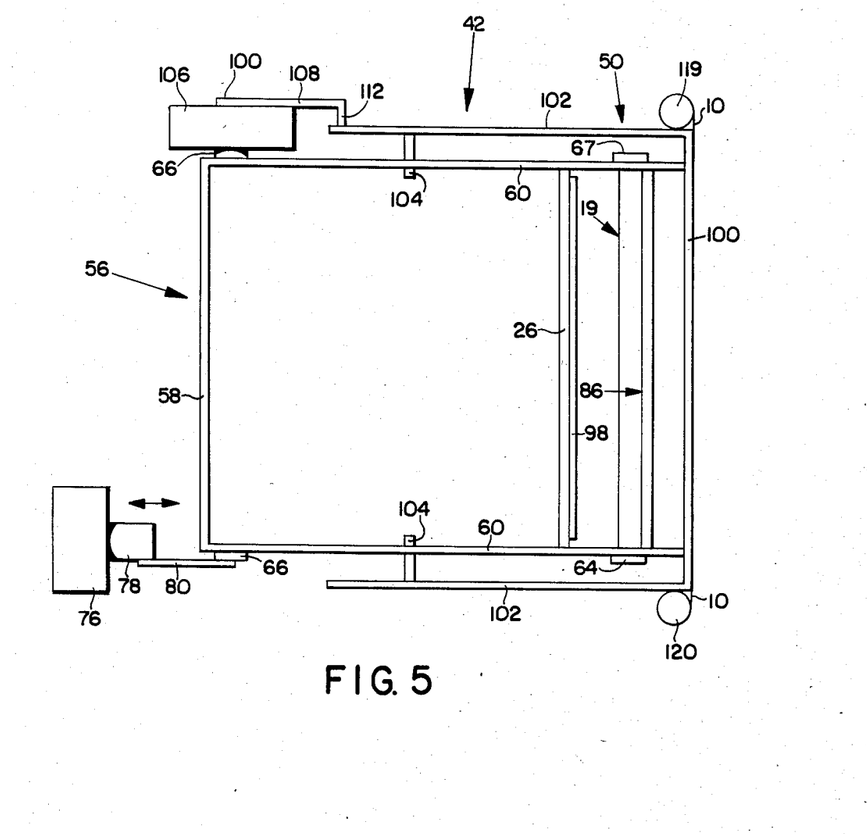
FIG. 5 is a plan view of the system components of FIG. 4.

As best shown in FIGS. 4 and 5, the print head frame 56 is a generally rectangular structure comprising a laterally extending print head 19 at the front end, a laterally extending rearwardly spaced crossbar member 58, opposite print head 19, and a pair of longitudinally extending side rail members 60 which connect the outboard lateral ends of print head 19 and rear member 58.

Frame 56 is supported over a fixed or grounded base member 62 by four upstanding pivot links including a pair of forward pivot links 64 and a pair of rear pivot links 66. The forward links 64 each have their upper end pivotally connected to a corresponding one of the opposite side rail members 60, at pivot pin 68, near the front of frame 56. The lower end of each link 64 is pivotally connected, at pin 70, to the base 62. Similarly, the rear links 66 each have their upper end pivotally connected to a corresponding side rail member 60, at pivot pin 72, near the rear of frame 56, and their lower end pivotally connected to base 62 at pivot pin 74.

Interconnected in this manner, the horizontal base 62 and oppositely disposed print head frame 56 along with the upstanding pairs of forward and rear links 64 and 66 form a parallelogram or four-bar linkage which is operative to move the print head frame 56 and ribbon support 50 thereon between the extended and retracted positions.

In the illustrated embodiment, the four-bar linkage is operated or driven by a grounded linear actuator such as the diagrammtically illustrated solenoid actuator 76 having a retractable plunger 78 coupled to one of the rear links 66 by means of a conntecting link 80 having its rear end pivotally connected to plunger 78 at pivot pin 82 and its forward end connected to rear link 66 at pivot pin 84.

When solenoid 78 is not energized, plunger 78 is spring biased forwardly to its normal extended position locating the print head frame 56 in the extended operative printing position. Upon energizing solenoid 76, plunger 78 retracts or moves rearwardly causing the frame supporting links 64 and 66 to pivot in a counterclockwise direction about their lower pivot pins 70 and 74. This motion translates frame 56 rearwardly to its retracted position of FIG. 6 thereby disengaging the registered ink stripe segment 17. At this time, the ribbon support 50 is moved to change the ink stripe 17 at the registered position as will become apparent later. Thereafter, solenoid 76 is deenergized and the plunger 78 moves forwardly under the influence of its biasing spring causing the links 64 and 66 to pivot in a clockwise direction thereby moving frame 56 forwardly back to its extended printing position of FIG. 4.

Figure 7:
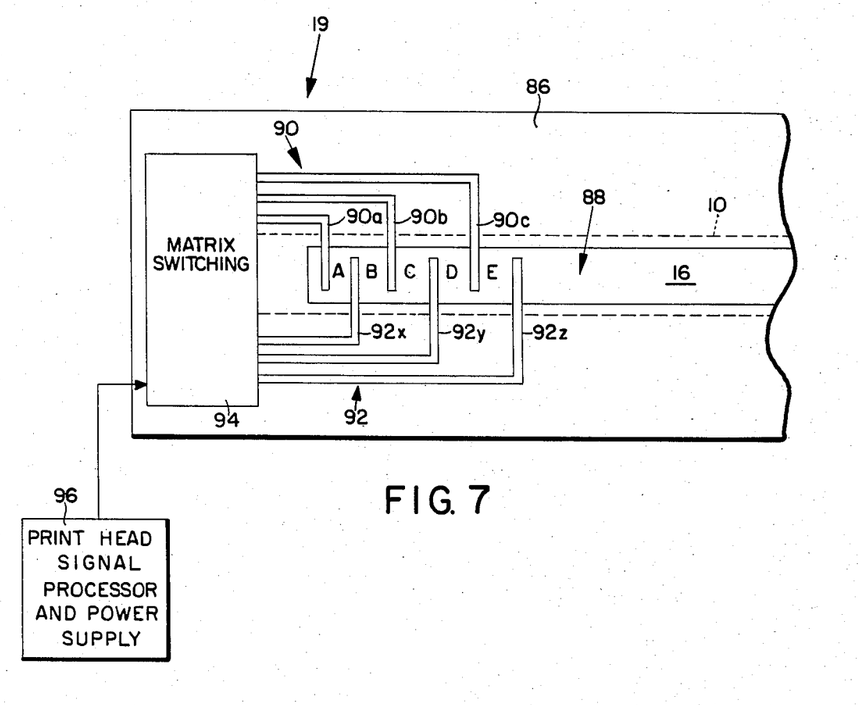
FIG. 7 is a diagrammatic representation of a portion of a print head component of the recording system.

As best shown in FIGS. 4 and 7, the print head 19 is of the line printing type and includes a laterally extending body or support member 86 made of electrically insulating material. Support 86 has an elongated laterally extending slot or opening 88 therein which is coextensive with the length of a line of the image to be recorded. Opening 88 defines a "window" into which the free ends of a plurality of signal electrodes 90 extend in interdigitated relationship with a plurality of corresponding spaced counter electrodes 92. The electrodes 90 and 92 are mounted on support 86 and each comprises a separate electrical contact having its end opposite the free end connected to a matrix switching device 94 which is operated by a print head signal processor and power supply 96 controlled by control system 24.

The ribbon 10 is supported on member 50 so that a selected one of the ink stripes 17 is registered or aligned with the window 88. When so registered, the free ends of electrodes 90 and 92 are in engagement with a corresponding segment of the indicator layer 16 on the back side of ribbon 10. To print a dot 36 in pixel area A between the first two electrodes, the recording signal Vs is applied to the first signal electrode 90A which is paired with the first counter-electrode 92X. That is, the print head signal processor 96 operates the matrix switching device 94 so that voltage Vs is applied to electrode 90A and the counter-electrode 92X is lowered to a ground potential relative to $V_s$ so that the current flow path I is established therebetween to generate heat in the corresponding pixel area section of the resistive layer 14. To selectively print a dot in the next pixel area B, signal voltage $V_s$ is applied to the second signal electrode 90B which is paired with the first counter-electrode 92X. A dot 36 is printed in the next adjacent pixel area C by pairing the second signal electrode 90B with the next counter-electrode 92Y . . . etc. Additional electrode pairs (not shown) are provided along the entire length of slot 88. By the use of appropriate software and matrix switching techniques, electrode pairs corresponding to each of the pixel area sections in the line can be addressed individually.

In order to optically monitor the back side of the registered segment of ribbon 10 where indicator marks 40 are formed, system 42 includes a photodetector or sensor 26 mounted on frame 56 behind print head support 86 such that the field of view of the photodetector is in alignment with slot 88.

Preferably, photodetector 26 comprises a linear array of photodiodes (designated 98 in FIG. 4) or the like which are equal in number and spacing to the pairs of electrodes 90 and 92. The photodiodes 98 "look at" the back side of ribbon 10 through window 88 for receiving light reflected from the corresponding pixel area sections of the registered segment of layer 16. In response to the reflected light input, the photodiodes provide density signals to control system 24 which are indicative of the pixel density on sheet 18 resulting from ink transfer.

While it is possible to sense the level of ambient light reflected from layer 16, it is preferable to provide supplemental illumination for this area in the interest of improving efficiency and obtaining consistent and reliable density readings. Thus, system 42 preferably includes a lamp (not shown) which is configured to direct its light output through window 88 to better illuminate the back side of the ribbon registered therewith. For more details about the photodiodes 98, the lamp, and corrective optics which may be used to focus images of the layer 16 pixel area sections on corresponding photodiodes, reference may be had to my copending application U.S. Ser. No. 717,121 filed on Mar. 28, 1985, entitled "Thermal Transfer Recording System and Method", which is incorporated by reference herein.

The movable ribbon support 50 serves to both support ribbon 10 in operative relation to the print head 19, and to sequentially present each of the four different color ink stripes 17 at the registered position.

As best on FIGS. 4 and 5, ribbon support 50 is a generally U-shaped component including a laterally extending, curved ribbon supporting and guiding member 100 at its forward end in front of print head support 86, and a pair of oppositely spaced mounting arms 102 extending rearwardly from member 100 outboard of the print head frame side rails 60. The mounting arms are pivotally connected to frame side rails 60 at pivot pins 104 so that in response to pivoting support 50 thereabout the ribbon support member 100 can be moved back and forth along a large radius or shallow arc path of travel which passes print head opening 88 where the recording electrodes are located.

In the illustrated embodiment, the means for moving or pivoting support 50 include a reversible stepper motor 106, secured to one of the links 66, and a lever 108 having one end 110 connected to the drive shaft of motor 106 and its opposite end 112 pivotally connected to the trailing end of the corresponding mounting arm 102 behind its pivotal connection to frame 56 at pin 104. As viewed in FIG. 4, when motor 106 is driven in a clockwise direction, bell crank 108 pushes downwardly on the end of mounting arm 102 causing support 50 to pivot in a counterclockwise direction about pins 104. This motion causes the ribbon support member 100 to move upwardly along its arcuate path of travel past print head slot 88. By reversing the direction of rotation of motor 106, support 50 pivots in the opposite direction thereby moving ribbon support member 100 downwardly along its path of travel.

Ribbon support member 100 is formed to have a curved shallow arc cross-section and is arranged with its outer convex surface facing the recording sheet 18 and its inner concave surface facing the print head support 86. Member 100 has a laterally extending central opening 114 therein which is bordered, top and bottom, by a pair of L-shaped ribbon support and guide channels 116 and 118. These channels are formed on the outer concave surface of member 100 and are provided for receiving the top and bottom edges of a length or segment of ribbon 10 which spans opening 114 in overlying relation thereto with the ink layer 12 outermost facing the receiving sheet 18 and the indicator layer in the back facing print head 19.

In the illustrated embodiment, ribbon 10 is supplied from a supply reel 119 mounted on the forward end of one mounting arm 102 adjacent member 100. From supply reel 119, ribbon 10 extends laterally across the width of member 100 to a take-up reel 120 mounted on the forward end of the opposite mounting arm 102. The reels 119 and 120 are adapated to be rotatably driven by conventional reel drive means, such as a stepper motor (not shown) for advancing the ribbon over the front of member 100 to present a fresh segment of ribbon for each line that is to be recorded.

The segment of ribbon 10 spanning opening 114 is held taut so that its upper and lower edges are urged rearwardly into the support and guide channels 116 and 118. Owing to the curved nature of member 100, this tends to keep the ink stripes 17 that are not at the registered position held back slightly out of contact with sheet 18 when the print head frame 56 is at the extended printing position. Thus, system 42 is configured to include means for moving the ribbon transverse to its length direction and the linear array of electrodes in the print head for sequentially presenting each of the four different ink stripes 17 at the registered position and it also includes means for moving the ribbon laterally in the direction of its length or parallel to the array of electrodes for presenting a fresh segment of ribbon in operative relation with the print head for each new line to be recorded.

Figure 8:
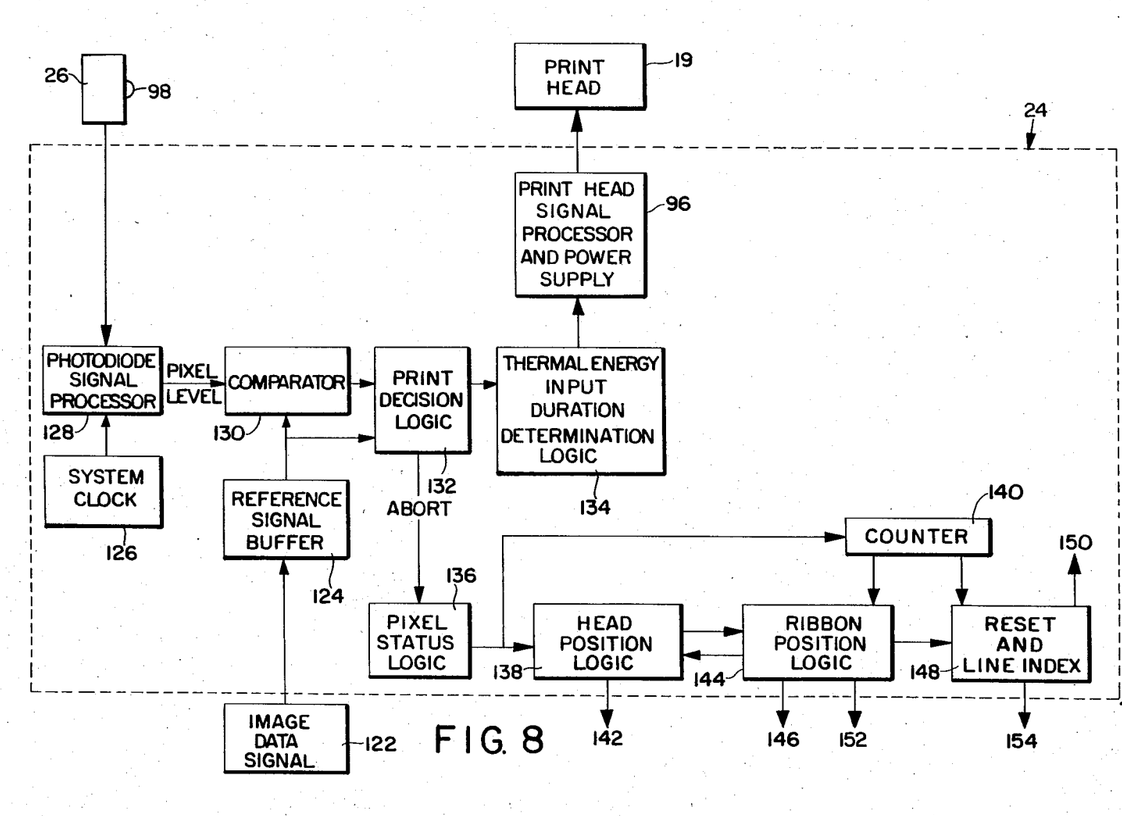
FIG. 8 is a functional block diagram of a control system for the recording system embodying the present invention.

In FIG. 8, functional components of the control system 24 are shown in block diagram form.

In preparation for recording a color tonal image on sheet 18, electronic image data input signals 122 defining the pixel by pixel color and density of the image matrix are fed into means for receiving these signals, such as a color and density reference signal buffer memory 124. The image signals specify density or dot size for each of the four different color inks carried on ribbon 10.

Preferably, the image signals are in digital form provided from an image processing computer or digital data storage device such as a disk or tape drive. If the electronic image signals were originally recorded in analog form from a video source, it is preferable that they undergo analog to digital conversion, in a manner that is well known in the art, before transmission to buffer 124. Alternatively, control system 24 may optionally include an analog to digital signal conversion subsystem for receiving analog video signals directly and converting them to digital form within control system 24. Preferably, buffer 124 is a full-frame image buffer for storing the entire image, but it also may be configured to receive portions of the image signals sequentially and for this purpose buffer 124 may comprise a smaller memory storage device for holding only one or two lines of the image.

Thus, control system 24 includes means for receiving electronic image signals which it utilizes as reference signals that define desired or target pixel color and density for comparison with observed density signals provided from the optical monitoring photodiode detector 26 in the feedback loop.

The operation of control system 24 is coordinated with reference to a system clock 126 which among other things sets the timing for serially reading the light level of pixel density signals from each of the photodiodes 98 in the linear array. Light level or density signals from detector 26 are fed into a photodiode signal processor 128 which converts analog signals provided from detector 26 to digital form. Alternatively, this A/D conversion may take place in a subsystem incorporated into detector 26.

Density signals from processor 128 along with reference signals from buffer 124 are fed into a signal comparator 130 which provides signals indicative of the comparison to a print decision logic system 132. Based on the comparison value information, system 132 provides either a print command signal or an abort signal for each pixel in the current line. Print command signals are fed to a thermal input duration determining logic system 134, and abort signals are fed to a pixel status logic system 136.

Upon receiving a print command, system 134 utilizes look-up tables therein to set the time period for energizing each of the electrode pairs that are to be activated and feeds this information to the print head signal processor and power supply 96 which actuates the selected electrodes in accordance with these instructions.

In response to incoming abort signals, system 136 keeps track of which pixels in the line have been recorded to the desired density with the currently registered ink color and those that yet need additional thermal input for completion. When abort signals have been received for every pixel in the current line, system 136 provides an output signal to both a head position logic system 138 and to a counter 140 that counts the four steps necessary to sequentially record the four different ink colors on the current line.

Upon receiving the output signal from status system 136, the head position logic system 138 provides a first output signal 142 which actuates solenoid 76 to retract frame 56 and move the ribbon support 50 and the print head 19 away from sheet 18. Then system 138 provides a second output signal, indicating retraction, to a ribbon position logic system 144 which also receives an output signal from the counter 140.

Assume for the moment, that the line recording cycle begins with the first ink stripe 17Y (yellow) at the registered position as shown in FIG. 4. After the yellow dots have been recorded, the counter will register a count of one which indicates to the ribbon position logic system 144 that the ribbon support 50 should be pivoted one stripe position in the clockwise direction to move the next stripe 17C to the registered position. System 144 responds by providing an output signal 146 to the stepper motor 106 which rotates in the proper direction to index ribbon 10 to the next stripe registration position, shown in FIG. 6. Then system 144 provides an output signal back to the head position logic system 138 which responds by cutting off signal 142. This deenergizes solenoid 76 so that frame 56 returns to the extended position. System 144 also provides another output signal to a reset and line index logic system 148 which also receives the count signal from counter 140.

With the count at one, system 148 provides a reset output signal 150 for resetting various logic components in preparation for recording dots of the next color on the current line. After each color is recorded, the count provided from counter 140 increases by one number. When the count reaches four, indicating that the last stripe 17B in the set has been recorded, the ribbon position logic system 144 and the reset in line index logic system 148 respond differently to this count number input.

System 144 now provides an output signal 146 to the stepper motor 106 which causes it to reverse its direction of rotation and pivot ribbon support 50 in the counterclockwise direction through three indexing steps to bring the first ink stripe 17Y in the set back to the registered position in preparation for recording the next line on sheet 18. System 144 also provides another output signal 152 which actuates the means for driving the ribbon supply and take-up reels 119 and 120 to advance the ribbon across the print head support 86 and locate a fresh ribbon segment in operative relation with the print head 19.

In addition to providing the normal reset signal 150 system 148 responds to the count number four by providing an output signal 154 which actuates the means for driving the paper rollers 52 and 54 to advance or index the recording sheet 18 to the next line position. In this instance, the reset signal 150 also is effective to reset the counter 140 back to its initial zero count.

In the operation of recording system 42, the ribbon support 50 is automatically set at an initial position which locates the lowermost or first ink stripe 17Y in the set at the registered position. Also, the print head frame 56 is in the extended position with the electrode pairs thereon in engagement with that segment of indicator layer 16 opposite stripe 17Y which is urged into contact with sheet 18 at the first image line position. The counter 140 is initially set at zero.

The thermal transfer recording cycle is initiated by actuating the print decision logic system 132. This may be done be providing a start button (not shown) which the operator manually actuates.

In response to actuating system 132, reference signals indicating the desired density for the yellow component of all of the pixels in the first line are sent from buffer 124 to system 132. System 132 evaluates this information and for those pixel areas in which no yellow dot is to be recorded, abort signals are sent to the pixel status logic system 136. Print command signals for those pixel areas in which yellow is to be printed are transmitted from system 132 to system 134. System 134, using the look-up tables, provides initial thermal input duration signals indicative of the time period that each selected electrode pair is to be energized to print an initial yellow dot 36 in its corresponding pixel area on sheet 18 and to form a corresponding indicator mark 40 in the corresponding pixel area section of indicator layer 16.

To minimize the length of the line recording cycle, it is preferable that the initial dot be smaller than the final dot size, but large enough so that the number of successive thermal applications needed to make a dot of the required size is not excessive.

For example, system 134 will provide initial thermal input time signals to form an initial dot 36 and corresponding indicator mark 40 that is approximately 75%–85% of the final or desired dot size. This means, that each initial dot will be smaller than the pixel area in which it is formed. Even if the reference signals indicate that a high density dot which substantially fills the pixel area is to be recorded, initially a smaller dot will be formed to trigger formation of the optically detectable indicator mark 40 for feed back loop utilization to achieve precise control over dot size or pixel density.

The initial duration signals are fed from system 134 to the print head signal processor and power supply 96 which is capable of addressing each of the electrode pairs in print head 19 and applying signal voltage $V_s$ thereto for the initial time indicated.

The selected electrode pairs 90 and 92 apply voltage Vs to the indicator layer 16 on the back of ribbon 10 causing heat generating current to flow in the corresponding selected sections of resistive layer 14. In response to this heat, ink in sections of ink stripe 17Y corresponding to the selected pixel areas is fused and transfers to sheet 18 to form the initial yellow dots 36 in their selected pixel areas, and the thermally sensitive dyes in the corresponding opposite pixel area sections of layer 16 are activated to form corresponding initial indicator marks 40 that are proportional to the dots 36. The initial indicator marks 40 are formed between the spaced electrodes and are visible through the slot or window 88. The density or reflected light level of each corresponding pixel area section of layer 16 between adjacent electrodes is road by the photodetector 26. These density signals, which are indicative of pixel density on sheet 18 are transmitted to signal processor 128 which provides the pixel density signal indications to comparator 130 for comparing the initial pixel density with the yellow component density signals provided from reference signal buffer 124.

Correlating the photodiode output signals to the refelective characteristics of the back side layer 16 of any particular type of ribbon 10,may be done by taking test readings on a blank ribbon 10 to establish a reference signal level for highest reflectivity which is indicative of the lowest density or brightest pixel in the grey scale. As a preferable alternative, the setting of the reference level may be built into the recording cycle by having system 24 automatically take a photocell reading of the corresponding pixel area sections on layer 16 registered with the observation window 88 prior to energizing the print head to record the initial dots 36 and corresponding indicator marks 40.

As noted earlier, additional dot and indicator mark growth may occur subsequent to the deenergization of the electrode pairs in print head 19 due to residual heat attributable to the thermal inertia characteristics of the ribbon structure. Therefore it is preferable to delay the photodetector reading for a short time after the electrode pairs are deenergized so that any additional growth will be included in this reading.

The pixel density readings are compared to the reference signals by comparator 130 which supplies signals indicative of the difference therebetween to the print decision logic system 132. Because the initial dot size was calculated to be smaller than the final size, most of the differential signals will indicate that additional thermal input is necessary to make each of the dots slightly larger. However, because of the variability of thermal recording parameters, at least some of the dots may have reached desired size even though the initial thermal input was intended to create a dot of only 75%–85% of desired size. For those pixels, the system 132 provides abort signals through the pixel status system 136 and terminates any further thermal input thereto during the next portion of the recording cycle.

For those pixels that had not yet reached the target or desired density, system 132 will issue print commands to system 134 which will then provide signals indicative of the times needed to produce additional dot growth. Because the objective now is to make the dots only a little bit larger than initial size, the duration of heat application will be shorter than the times used to record the larger initial dots.

The selected electrode pairs are energized and, following a short delay for thermal stabalization, the photodiodes 98 once again read the level of light reflected from layer 16 and feed the signals back to the comparator 130 to test these readings against the reference levels. Again, system 132 recycles and provides abort signals for those dots that have reached their target size and print commands for pixel areas that need additional thermal input to bring their density up to target level.

When abort signals have been provided for all pixels in the line, recording of the yellow component is completed and system 136 provides its output signals to the counter 140 to advance the count number to one, and to the print head logic system 138 to begin the process of switching to the next ink stripe 17C to overprint cyan dots on the first line.

System 138 sends signal 142 to solenoid 76 which moves the frame 56 back to the retracted position. This is done to disengage the multi-stripe ink layer 12 from sheet 18 before ribbon 10 is moved by support 50 to prevent ink smearing. Ribbon position logic system 144 recognizes that the count number is less than four and provides signal 146, but not the reel drive signal 152, which causes support 50 to index or pivot one step in the clockwise direction. This displaces the first stripe 17Y from the registered position and replaces it with the second stripe in the set 17C. Then, system 144 provides one output signal to system 138, which responds by deenergizing solenoid 76 thereby allowing frame 56 to return to the extended printing position, and another output signal to the reset and line index system 148. System 148, having received the count number one, provides the reset signal 150 to reset components for over printing with cyan ink, but does not provide the paper index signal 154 so sheet 18 remains in place.

Upon receiving the reset signal 150, the print decision logic system 132 automatically is actuated to initiate the recording of cyan dots on the first line. It receives reference signals from buffer 124 indicating the density of the cyan component for each of the selected pixel areas in the first line and provides an output to system 134 which triggers the recording of the initial cyan dots 36.

The cyan recording cycle is accomplished in exactly the same manner described above for the recording of yellow dot 36. This recording cycle is followed by two more successive cycles for recording the magneta and black dots 36.

When the black dots have been recorded from the last stripe 17B in the set, the counter 140 provides the count number four to the ribbon position logic system 144 and the reset and line index system 148. System 144 responds by providing the signal 146 which reverses the direction of stepper motor 106 causing ribbon support 50 to index in the counterclockwise direction through three steps thereby resetting the ribbon 10 so that the first stripe 17Y is once again in the registered position in preparation for recording the yellow components of the next line. System 144 also provides the reel drive signal 152 for advancing ribbon 10 across support 50 to present a fresh segment of the ribbon in front of the print head 19. System 148 responds to the count number by additionally providing signal 154 to advance sheet 18 to the next line position.

In this manner, the color image is recorded line by line. During each complete line recording cycle, the four ink stripes in the set are successively moved to the registered position and dots are transferred to sheet 18 utilizing the feed back provided by the indicator marks 40 to achieve precise control over the pixel density for each of the four different print ink colors.

In the above described recording process the desired dot in each pixel area is formed in steps. First, an initial dot is made and a corresponding pixel area section or layer 16 is measured for comparison against the reference signal. Then, if necessary, one or more additional short pulses of thermal energy are sequentially applied for that pixel area to bring it up to its target density. Through the use of feedback, dot size can be controlled to a much higher degree than if this system were to simply operate in an open loop manner with dot size being correlated to the duration of thermal energy input for each selected pixel area.

As an alternative to the stepwise mode of operation, system 42 may be configured for continuous power application with feedback monitoring of dot formation. In this case, the electrode pairs corresponding to the pixel areas that are to have dots recorded therein in accordance with the reference signals are all turned on simultaneously. As the indicator marks 40 appear and continue to grow, pixel density is continuously monitored and compared with the reference signals. When the predetermined comparison value is achieved for a given pixel area, the system automatically deenergizes its corresponding electrode pair. While this mode of operation may shorten the recording cycle somewhat, compared to the stepwise dot formation cycle, the degree of control over dot size may not be as great because additional dot and indicator mark growth due to thermal inertia of ribbon 10 is not accounted for in the control provided by the feedback loop. A certain amount of additional growth may be anticipated, and the heating elements could be turned off at a lower predetermined comparison value to provide some compensation for this additional dot growth. However, it would seem that the higher degree of accuracy provided by the stepwise method may be preferable unless there is an urgent need to reduce recording cycle time.

While the illustrated embodiment of recording system 42 has been portrayed as a line recording system, it is within the scope of the invention to modify this system to provide a scanning mode of operation therein a print head 19, accompanying ribbon support 50 and photodetector 26 that are narrower than the full line width are moved back and forth across the width of sheet 18 to effect image recording. Also, system 42 may be configured to record on more than one line at a time or to record the entire image so as to minimize or eliminate the need for relative movement between components of the recording system.

While in the illustrated embodiment, sensing or monitoring of the indicator marks 40 is achieved with an electro-optical photodetector operating in a visible light band, it is within the scope of the invention to modify the system and employ other types of detectors which may operate at other wavelengths or may include other type of structures (for example fiber optics) to monitor recorded pixel density.

Because certain other modifications or changes may be made to the above described thermal transfer ribbon and recording system, and the method for using the same, without departing from the spirit and scope of the invention involved herein, it is intended that all matter contained in the above description or shown in the accompanying drawings be interpreted as illustrative and not in a limiting sense.

What is claimed is:

1. A thermal transfer recording system for recording a color image, represented by pixel areas of varied color and density, on a recording sheet with a thermal transfer ribbon having on one side, a set of different color thermally transferable ink stripes from which ink may be transfered in sequence to record dots defining a desired pixel area color and density, and a thermally sensitive indicator layer on the opposite side for providing optically detectable marks that correspond and are proportional to dots recorded by ink transfer from each of the ink stripes in the set, the ribbon being configured such that dot and mark size increases with increased amounts of heat applied to the ribbon to form a dot and corresponding mark, said recording system comprising:

means for receiving image signals for each of the different ink colors indicative of a desired color and density for each pixel area of the desired image;

means for supporting a recording sheet;

a print head locatable at a printing position with respect to the recording sheet and being operable for effecting the application heat to selected pixel area sections of a single ink stripe segment of the ribbon positioned in registration with said print head while providing access to a registered segment of the indicator layer corresponding to said registered ink stripe segment for optical monitoring purposes;

a ribbon support mounting the ribbon for movement between said print head and recording sheet and being operable to sequentially present each ink strip segment in the set at said registered position;

means for optically monitoring the density of pixel area sections of the registered indicator layer segment and for providing density signals indicative of the density of each selected pixel area;

means for comparing said density signals with said image signals and for providing density comparison value signals for each selected pixel area;

means for operating said ribbon support to sequentially present each of the ink stripe segments at said registered position during the course of a recording cycle; and means for operating said print head to effect dot and mark formation for each ink stripe segment sequentially presented at said registered position during the course of a recording cycle, said print head operating means initially being responsive to said image signals for regulating an initial application of heat to selected pixel area sections of a registered segment of the ribbon to form for each selected pixel area a dot and corresponding mark having an initial size smaller than necessary to achieve its said desired density and, thereafter, being responsive to said density comparison value signals for regulating further application of heat to progressively increase the size of said initial size dot and corresponding mark until a predetermined value of density comparison is achieved for each selected pixel area.

2. The recording system of claim 1 further including a carriage mounting said print head and ribbon support, said carriage being movable relative to the recording sheet between an extended position, wherein a registered ink stripe segment engages the recording sheet and said print head is at said printing position in engagement with an opposite registered indicator segment of the ribbon corresponding to the registered ink stripe segment, and a retracted position wherein said print head and ribbon support are spaced from the recording sheet sufficiently to disengage the registered ink stripe segment therefrom.

3. The recording system of claim 2 wherein said print head is fixedly mounted on said carriage and said ribbon support is mounted on said carriage for movement relative to said print head when said carriage is located in said retracted position for sequentially presenting each ink stripe segment in the set at said registered position.

4. The recording system of claim 3 wherein said ribbon support is mounted for pivotal movement relative to said print head.

5. The recording system of claim 4 wherein said means for operating said ribbon support pivots said ribbon support in one direction in steps to sequentially present each ink stripe segment, starting with a first ink stripe segment in the set, at said registered position and, following ink transfer from a last ink stripe segment in the set, pivots said ribbon support in a direction opposite said one direction to relocate the first ink stripe segment at said registerd position in preparation for further recording.

6. The recording system of claim 5 further including means for advancing the ribbon relative to said ribbon support when said carriage is in said retracted position for replacing a previously used length of ribbon aligned with said print head with a fresh length of ribbon.

7. The recording system of claim 1 further including means for selectively advancing the recording sheet relative to said printing position, said advancing means being operative to maintain the recording sheet at a fixed position while ink is transferred to selected pixel areas in a line from each of the ink stripes presented at the registered position during a line recording cycle and thereafter is operative to advance the recording sheet one line position in preparation for recording the next line.

8. The recording system of claim 1 wherein the ribbon additionally includes a resistive heating element layer between the set of ink stripes and the indicator layer, said print head includes a support member having an opening therein into which extends an array of pairs of spaced electrodes through which recording signals are applied to selected pixel area sections of a segment of the indicator layer registered with said opening to generate heat in the heating element layer and thereby form dots of the registered ink stripe color on the recording sheet and corresponding indicator marks in the indicator layer.

9. The recording system of claim 8 further including a carriage, mounted for movement relative to the recording sheet between extended and retracted positions, on which said print head is fixedly mounted and said ribbon support is mounted for movement relative to said print head, when said carriage is in said retracted position, for sequentially presenting each of the ink stripes in the set at said registered position.

10. The recording system of claim 9 wherein said optical monitoring means include a photodetector mounted on said carriage and aligned with said opening in said print head support for measuring the level of light reflected from that portion of the indicator layer registered with said opening to provide said density signals.

11. The recording system of claim 9 wherein said ribbon support is mounted for pivotal motion relative to said print head.

12. The recording system of claim 11 wherein the ink stripes are disposed in side by side parallel relation extending in a direction along the length of the ribbon and said ribbon support is configured to pivot in a direction that advances the ink stripe segment along a path of travel relative to said print head that is transverse to said direction in which said ink stripes extend.

13. The recording system of claim 12 further include means operative to advance the ribbon lengthwise relative to said ribbon support for replacing a used length of ribbon aligned with said print head with a fresh length of ribbon.

14. The recording system of claim 8 wherein said means for optically monitoring the density of pixel area sections of the registered indicator layer segment includes a photodectector disposed in alignment with said print head support opening for measuring the level of light reflected from each pixel area section of the registered indicator layer segment.

15. The recording system of claim 14 wherein said print head is configured to record a line of dots at a time and said system further includes means for providing a status signal indicative that all pixel area sections in a line have achieved desired density for a given registered ink stripe segment in the set, and said ribbon support operating means is responsive to said status signal for moving said ribbon support to present the next ink stripe segment in the set at said registered position.

16. A color thermal transfer ribbon comprising:
a multi-stripe thermally transferable ink layer including a plurality of different color parallel ink stripes;
a thermally sensitive indicator layer; and
a resistive layer for generating heat in response to electrical current flow therein, said resistive layer being located between and in thermally conductive relation to both said ink and indicator layers so that heat selectively generated in a section of said resistive layer aligned with a selected one of said ink stripes flows to both said selected stripe and a corresponding section of said indicator layer also aligned with said selected ink stripe for activating ink in said selected stripe to effect ink transfer and for activating said corresponding section of said indicator layer to form therein an optically detectable indicator mark that is proportional to ink transfer from said selected strip, said ribbon being configured such that electrical signals applied to a selected stripe portion of said indicator layer between a pair of spaced apart electrodes in contact therewith causes generation of heat in said selected stripe portion of said ribbon between said pair of electrodes and said selected stripe portion of said indicator layer functions to indicate while said pair of electrodes are in contact therewith.

17. The transfer ribbon of claim 16 wherein said ink layer includes ink stripes of at least three different colors.

18. The transfer ribbon of claim 17 wherein said ink layer includes four different color ink stripes.

19. The transfer of claim 18 wherein said four different colors are yellow, cyan, magenta and black.

20. The transfer ribbon of claim 16 wherein said indicator layer is configured to provide separate indicator marks for each different color ink stripe.

21. The transfer ribbon of claim 16 wherein said indicator layer is also electro-conductive such that electrical signals applied between a pair of spaced apart electrodes in contact with a section of said indicator layer corresponding to a selected one of said ink stripes causes establishment of a current flow path from one electrode through said indicator layer to an aligned corresponding section of said resistive layer, along said section of said resistive layer towards the other electrode, and then back through said indicator layer to the other electrode.

22. The transfer ribbon of claim 16 wherein ink is transferred from each different ink stripe in succession to a recording sheet to form dots thereon by successively bringing each of said stripes into engagement with said recording sheet and selectively generating heat in its aligned section of said resistive layer, and wherein a dot formed by ink transfer and a corresponding indicator mark formed in said indicator layer increases in size with increasing amounts of heat applied to form such a dot and mark.

23. A color thermal transfer ribbon for use with a thermal transfer recording system for recording a tonal color image on an ink receiving recording sheet, the system being of the type including an optical detector as part of a feed back system for controlling recorded dot size, said ribbon comprising;
   a multi-stripe thermally transferable ink layer including a plurality of different color parallel ink stripes,
   a thermally sensitive indicator layer; and
   a resistive layer for generating heat in response to electrical current flow therein, said resistive layer being located between and in thermally conductive relation to both said ink and indicator layer so that heat selectively generated in a section of said resistive layer aligned with a selected one of said ink stripes flows to both said selected ink stripe and a corresponding section of said indicator layer also aligned with said selected ink stripe for activating ink in said selected stripe to effect ink transfer to the recording sheet, thereby recording a dot thereon, and for activating said corresponding section of said indicator layer to form therein an optically detectable indicator mark that is proportional to the size of the recorded dot and is accessible for detection by the recording system optical detector, said ribbon being configured such that electrical signals applied to a selected stripe portion of said indicator layer between a pair of spaced apart electrodes in contact therewith causes generation of heat in said selected stripe portion of said ribbon between said pair of electrodes and said selected stripe portion of said indicator layer functions to indicate while said pair of electrodes are in contact therewith.

* * * * *